US012674495B2

(12) United States Patent
Rodriguez Garcia

(10) Patent No.: US 12,674,495 B2
(45) Date of Patent: Jul. 7, 2026

(54) BRAKE SYSTEM WITH APPLICATION IN THE AUTOMOTIVE SECTOR WHICH DOES NOT GENERATE POLLUTING WASTE

(71) Applicant: José Luis Rodriguez Garcia, Caldes de Montbui (ES)

(72) Inventor: José Luis Rodriguez Garcia, Caldes de Montbui (ES)

( * ) Notice: Subject to any disclaimer, the term of this patent is extended or adjusted under 35 U.S.C. 154(b) by 388 days.

(21) Appl. No.: 18/569,577

(22) PCT Filed: Jun. 3, 2022

(86) PCT No.: PCT/ES2022/070348
§ 371 (c)(1),
(2) Date: Dec. 12, 2023

(87) PCT Pub. No.: WO2022/263691
PCT Pub. Date: Dec. 22, 2022

(65) Prior Publication Data
US 2024/0280148 A1 Aug. 22, 2024

(30) Foreign Application Priority Data
Jun. 14, 2021 (ES) ................................ ES202130541

(51) Int. Cl.
*F16D 57/00* (2006.01)
*F16D 65/16* (2006.01)
*F16D 121/24* (2012.01)
(52) U.S. Cl.
CPC ........... *F16D 57/007* (2013.01); *F16D 65/16* (2013.01); *F16D 2121/24* (2013.01)

(58) Field of Classification Search
CPC .......... B60T 10/04; B60T 10/00; F16D 57/00; F16D 57/02; F16D 57/04
USPC .................................................. 188/268, 269
See application file for complete search history.

(56) References Cited

U.S. PATENT DOCUMENTS 3,235,045 A 2/1966 Pop

FOREIGN PATENT DOCUMENTS

| DE | 202006010656 U1 * | 11/2006 | .............. B60T 13/66 |
| DE | 102006031738 A1 * | 1/2008 | .............. B60T 1/062 |
| DE | 102006031747 A1 * | 1/2008 | ................ F04B 1/14 |
| GB | 802056 A | 9/1958 | |
| GB | 2589152 A | 5/2021 | |

* cited by examiner

*Primary Examiner* — Devon C Kramer
(74) *Attorney, Agent, or Firm* — Maschoff Brennan

(57) ABSTRACT

The invention relates to a brake system (100) for braking a rotation shaft (1), characterised in that it comprises:
at least one piston (4), actuated by means of an electric linear actuator (3), able to move between a retracted release position and a final extended braking position;
a casing (6) adapted to rotate integrally with the rotation shaft, with a cavity closed by a perpendicular cover (5), provided with at least one opening in which the piston (4) is fitted, and the piston (4) having the ability to move forwards into the closed cavity and move backwards, and
a filling occupying the closed cavity, rotating with the casing, consisting of a dispersion (7) or amalgam formed by a powdery or granular product with a lubricating agent.

16 Claims, 2 Drawing Sheets

BRAKE SYSTEM WITH APPLICATION IN THE AUTOMOTIVE SECTOR WHICH DOES NOT GENERATE POLLUTING WASTE

TECHNICAL FIELD OF THE INVENTION

The present invention relates to a brake system with application in the automotive sector and that does not generate polluting waste. The brake system is electrically actuated and wherein the braking effect is produced on a rotation shaft.

The brake system is also applicable to train brakes, wind turbine brakes and machinery brakes.

BACKGROUND OF THE INVENTION

In current brake systems, the use of hydraulic technology is known when a great force is required to be exerted within a reduced space, as in the automotive sector. Although the control of these brakes is currently electronic, their performance is totally conditioned by the hydraulic portion, which continues to be inaccurate, dirty, slow and expensive.

In addition, current electric and/or regenerative brakes alone do not cover all braking situations nor do they have sufficient braking power to satisfactorily respond to an unforeseen situation that will always exist. For this reason, conventional hydraulic friction systems based on brake discs-calipers-pads continue to be installed in all electric vehicles to prevent this possibility.

Moreover, due to the wear of materials in brake pads or blocks, current automotive brake systems require mechanical or hydraulic systems that bring these components closer to the disc or to the drum as they wear out, with the intention that the braking parameters do not vary during the useful life thereof until they are replaced.

Another factor to take into account, in addition to periodic maintenance and replacement due to material wear, is the heating that is produced and the pollution generated by current braking systems in both automotive, aviation and railway sectors, as well as in machinery. After use, brake pads represent highly polluting residues, as are the abrasion particles of the brake pads that are released to the outside or the hydraulic oil leaks that can end up in the pads due to accidental leaks in the system.

Thus, it would be desirable to provide a brake system that were electrically actuated but did not rely on a pump brake and hence hydraulic actuation, which resulted in reduced heating of other brake system components and reduced pollution.

DESCRIPTION OF THE INVENTION

In order to provide a solution to the stated objectives, a brake system for the automotive sector is disclosed, electrically actuated and wherein the braking effect is produced on a rotation shaft.

In essence, the brake system is characterised in that it comprises:

at least one piston actuated by means of a respective electric linear actuator through which the piston is able to move a certain distance forwards and backwards between a retracted release position and a final extended braking position;

a casing provided with a central through hole surrounded by an inner wall of the casing, adapted for the integral coupling thereof to the rotation shaft, the walls of the casing configuring a cavity laterally closed by a cover that extends in a direction perpendicular to the rotation shaft and provided with a hole for the rotation shaft to pass therethrough but without integral coupling thereto, the cover being provided with at least one opening in which the at least one piston is fitted, closing said opening, and the at least one piston having the ability to move forwards into the closed cavity and move backwards, the at least one electric actuator that actuates the at least one piston being fixedly coupled to the cover, a filling, arranged occupying the entire closed cavity formed by the casing, the cover and the at least one piston, with the ability to rotate integrally with the casing, consisting of a dispersion or amalgam formed by a combination of a powdery or granular product, with a particle size comprised between 45 μm and 1 mm, and more preferably of 0.2 mm spherical, with a lubricating agent present between 1% and 25% by weight with respect to the dispersion or amalgam;

so that in a non-operating position of the brake system, the rotation shaft is capable of rotating the at least one piston being in a retracted release position and wherein the front surface, oriented towards the closed cavity, of the at least one piston is flush with the inner surface of the cover facing the closed cavity;

and in a progressive brake operating position of the brake system, the at least one piston passes into extended braking positions wherein the front surface of the at least one piston progressively enters into the filling of the closed cavity, moving the filling until it is compressed in a final extended braking position, the filling moving, occupying the space left by the at least one piston in the backward movement thereof when returning to the non-operating position, the cavity being kept closed at all times by the at least one piston in any of the positions.

According to another feature of the brake system of the invention, the at least one piston is able to move from the retracted release position to the final extended braking position according to a direction parallel to the axial direction of the central through hole of the casing.

According to a preferred embodiment of the invention, the brake system comprises at least two pistons, each one actuated by means of a respective electric linear actuator, fitted into respective openings in the cover.

Preferably, the casing is in the shape of a cylindrical disc or drum and the hardness of the material thereof is greater than the hardness of the powdery or granular product of the dispersion or amalgam enclosed in its cavity, thus preventing the powdery or granular product from damaging the casing when moving and compressing the filling when the piston or pistons enter the cavity, and as the filling moves to occupy the space left by the backward movement of the piston or pistons when they return to the non-operating position, when braking is released. It should be mentioned that the granular powdery product has a size such that the stresses to which it is subjected in the cavity practically cannot reduce it further, i.e., it remains with its initial particle size without being affected by the rotation about the rotation shaft nor the action of the piston or pistons.

In this way, the brake system of the invention acts progressively due to the resistance to rotation that opposes the entry of one or several pistons actuated by means of stepper motor-based electric linear actuators, against the filling material constituted by the suspension or amalgam enclosed in the cavity, which always rotates integrally inside the casing. This resistance to rotation would be comparable to the domestic example of a dough mixer wherein the container full of dough was that which rotated and at a given moment rods or blades were inserted into the rotating dough, which would cause the rotation of the dough to slow down and with it the rotation of the container would slow down until it can be stopped.

As this brake system requires a low input and output force of the piston or pistons, the actuation is performed by means of stepper motor-based electric linear actuators. Thus, the entire braking system of a vehicle comprising the brake system object of the invention is electronically regulated and actuated (without hydraulic installation of any kind) with the advantages that this entails in terms of speed and reliability. Its response time can reach 1 millisecond, a very successful result compared to the most advanced ABS (anti-lock braking system) systems, which are in the order of 1 tenth of a second. For example, a vehicle travelling at 120 km/h that had to use a current hydraulic ABS system would have a cadence every 3.33 m travelled, while with the brake system object of the invention this distance would be reduced to 0.033 m.

Although a minimum friction is always unavoidable, the brake system object of the invention does not brake by friction, but by the static action against the rotation of the filler consisting of the dispersion or amalgam formed by the powdery or granular product with the lubricating agent, a filling of a rather viscous nature, enclosed in the casing by a cover the openings of which are always closed or plugged by the pistons embedded therein. As it is a system wherein the filling remains completely enclosed in the cavity, it completely lacks environmental emissions, so it can be said that it is a non-polluting system, since there is no friction that generates dust or polluting particles that are released to the outside.

In addition, in the braking process according to the brake system of the invention, no heat is generated, since the application of a stress that mostly involves an elastic deformation is directly proportional to the stress without generating any heating.

Moreover, the brake system of the invention also solves the problem of the poor precision and slowness of the main brake systems in the automotive, aviation and railway sectors, which are currently actuated hydraulically or by means of compressed air. Thus, the brake system of the invention can be part of a train brake, a wind turbine brake and a machinery brake (for example, a brake that is activated for the emergency stop of a powerful machine, for braking the rotation of the axis of the machine that goes on rotating by inertia when its motor has already been electrically disconnected).

Contrary to current systems, the brake system object of the invention is practically wear-free and maintenance-free, making lifelong operation possible. In addition to having negligible wear value over the life of the vehicle, it does not require material wear approximation systems, which is yet another advantage over current brake systems.

According to another feature of the invention, the powdery or granular product of the dispersion or amalgam is a metal powder, a mineral powder, a ceramic powder or a mixture thereof. Preferably, the powdery or granular product is mainly made up of one or more of the components of the group consisting of iron powder, titanium powder, aluminium powder, hexagonal boron nitride (h-BN) powder, pressed graphite powder and ceramic powder. Preferably the powdery or granular product of the dispersion or amalgam has a particle size comprised between 45 μm and 1 mm, and more preferably of 0.2 mm spherical As for the lubricating agent of the dispersion or amalgam, according to a first preferred embodiment, it is a perfluoropolyether (PFPE) oil or grease preferably present between 2% and 8%, more preferably between 5% and 7%, and more preferably 6% by weight with respect to the dispersion or amalgam. Optionally, the lubricating agent of the dispersion or amalgam may further include graphite powder.

An example of perfluoropolyether (PFPE) oil is perfluorinated oil in which the polymer chain is fully saturated and only contains carbon, oxygen and fluorine, commercially known as Krytox® GPL 107, a DuPont™ product. This oil has a density of 1.78 g/cm$^3$ at 100° C. and of 1.95 g/cm$^3$ at 0° C., a viscosity of 144 (ASTM D2270), a kinematic viscosity of 1600 cSt at room temperature (20° C.) (ASTM D445), a kinematic viscosity of 440 cSt at 40° C. (ASTM D445), of 42.0 cSt at 100° C. (ASTM D445) and of 3.0 cSt at high temperature (260° C., ASTM D445). The coefficient of friction is 0.0800 (4-ball wear test; 1200 rpm/60 min; ASTM D4172). The estimated useful temperature range is −30° C. to 288° C., so it is stable under various conditions and application fields. In addition to the high stability thereof, other advantages are that it is non-flammable, recyclable, inert and has no acetal groups.

Moreover, according to a second preferred embodiment, the lubricating agent of the dispersion or amalgam is a polydimethylsiloxane (PDMS) fluid, oil or grease, present between 15% and 25%, preferably 20%, by weight with respect to the dispersion or amalgam. An example of this lubricating agent is the dimethylpolysiloxane fluid commercially known as POLISIL M-50. This fluid has a density of 0.96 g/cm$^3$ at 25° C., a viscosity of 50 mm$^2$/sec (CSP) at 25° C., a temperature viscosity coefficient of 0.59 and a surface tension of 20.7 dynes/cm at 25° C. Its solidification point is −50° C., its flash point is 280° C. and its combustion point is 350° C. Its advantages include excellent stability at high temperatures, little variation in viscosity as a function of temperature, being chemically inert against most chemical agents, low surface tension, immiscible with most organic materials and high compressibility. Optionally, the lubricating agent of the dispersion or amalgam may further include graphite powder.

To ensure that the filling consisting of the dispersion or amalgam always rotates integrally with the casing, the casing may be internally provided with drag elements arranged in one or more of the internal walls that make up the cavity and that extend inside the same, for example, metal projections, rods or spokes welded on the internal walls configuring the cavity, but the arrangement of which does not prevent or interfere with the movement of the piston or pistons.

Finally, it is considered appropriate to briefly describe another embodiment of the brake system object of the invention, which is especially advantageous to ensure that the powdery or granular product will hardly be present in dispersion, or will be present in a very small proportion, on the front surfaces of the pistons and the portions of the pistons that come into contact with the filling of the cavity of the casing, i.e., these portions of the pistons will be practically covered or impregnated only or to a large extent by the lubricating agent of the dispersion or amalgam. This is achieved when the casing is made of a magnetic material, or a material that can be magnetised or is provided with permanent magnets, unlike the cover and the pistons, and when the powdery or granular product of the dispersion or amalgam is mainly made up of iron powder and/or ferrite powder. In this way, due to the magnetic attraction to which it will be subjected, the iron powder will occupy, within the dispersion or amalgam that fills the cavity, positions closer to the walls of the casing, to the detriment of positions close to the pistons and to the cover.

BRIEF DESCRIPTION OF THE DRAWINGS

The accompanying drawings illustrate by way of non-limiting example, a preferred embodiment of the brake system object of the invention. In said drawings.

DETAILED DESCRIPTION OF THE DRAWINGS

Figure 1:
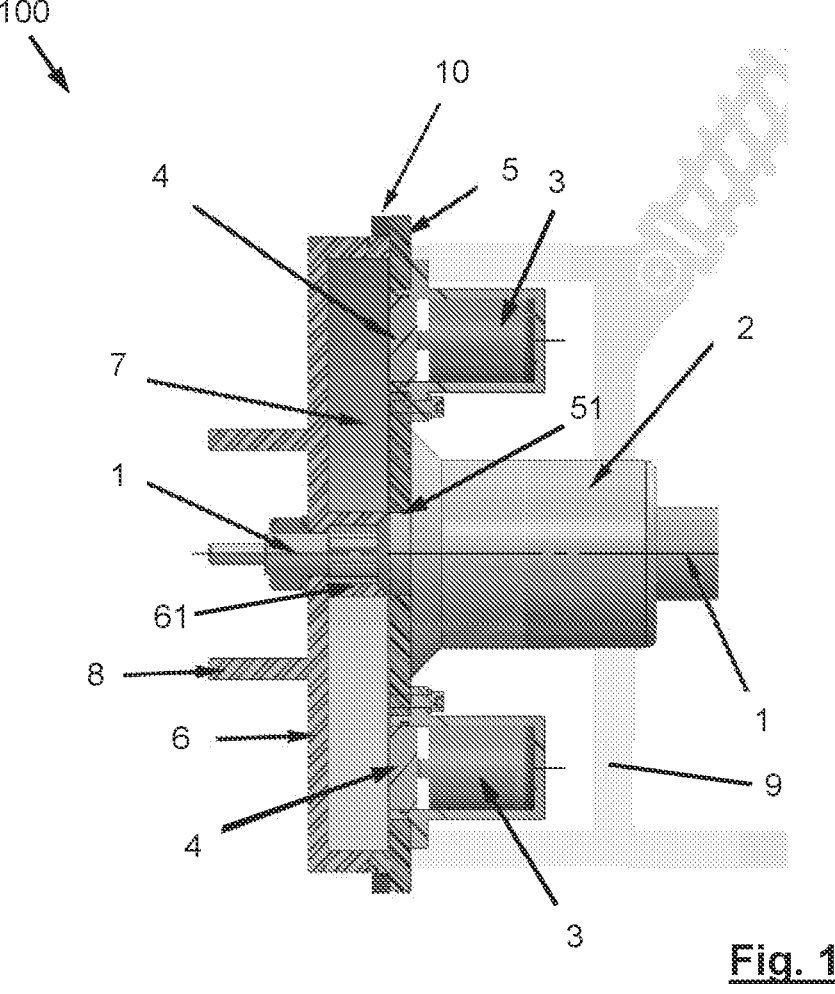
FIG. 1 is a longitudinal cross-sectional view (except for the rotation shaft and the hub) of the brake system object of the invention mounted on a rotation shaft of a wheel, in a non-operating position, wherein the rotation shaft rotates in a fully released situation, wherein the pistons are in a retracted release position.
Figure 2:
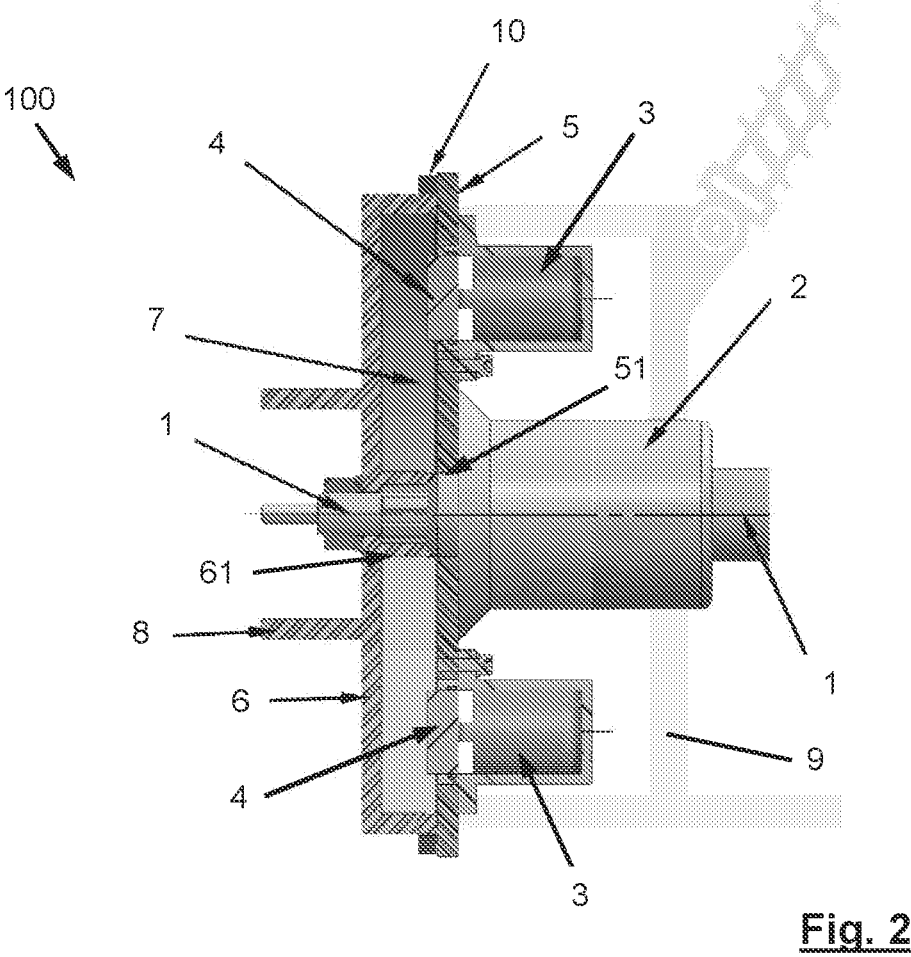
FIG. 2 is a cross-sectional view of the brake system of FIG. 1 but in an operating position of progressive braking of the rotation shaft, wherein the pistons are in an extended braking position.

FIGS. 1 and 2 show a brake system 100 for the automotive sector, electrically actuated and wherein the braking effect is produced on a rotation shaft 1, for example, a bearing as represented in the figures. It should be noted that the same brake system 100 is also applicable to a train brake, a wind turbine brake and a machinery brake, in which the braking effect is also produced on a rotation shaft 1.

It can be seen that the brake system 100 comprises two pistons 4 actuated by means of respective electric linear actuators 3 through which the pistons 4 are able to move a certain distance and can move forwards from a retracted position (FIG. 1) to an extended final braking position (FIG. 2), and move backwards from the final extended braking position to the retracted position.

The brake system 100 also comprises a casing 6, which together with a lateral closure cover 5, acquires a preferably metallic disc or drum configuration. The casing 6 is provided with a central through hole surrounded by an inner wall 61 of the casing 6, adapted for the integral coupling thereof to the rotation shaft 1, with which it rotates integrally. The walls of the casing 6 form a cavity inside the same laterally closed by the cover 5 that extends in a direction perpendicular to the rotation shaft 1. It is a relevant fact that said cavity is occupied by a filling consisting of a dispersion 7 or amalgam formed by a combination of a powdery or granular product, with a particle size comprised between 45 μm and 1 mm, and more preferably of 0.2 mm spherical, with a lubricating agent present between 1% and 25% by weight with respect to the dispersion 7 or amalgam.

The cover 5 that closes the cavity of the casing 6 also has a central hole 51 for the rotation shaft 1 to pass therethrough, although on this occasion the cover 5 does not rotate integrally with the rotation shaft 1. In the example represented in the figures, the cover 5 is provided with two openings and a piston 4 is fitted in each one, completely closing the closed cavity formed by the casing 6, the cover 5 and the pistons 4.

The electric linear actuators 3 are fixed on the cover 5 that laterally closes the casing 6. The cover 5 for its part is fixed to the stub axle 9 of the car so it is a static component inside the car, i.e., the cover does not rotate with the rotation shaft 1, unlike the casing 6 and the filling that occupies the cavity.

To reinforce that the filling consisting of a dispersion 7 or amalgam always rotates integrally with the casing 6, the casing 6 may be internally provided with drag elements to reinforce the integral rotation arranged in one or more of the internal walls that make up the cavity and that extend inside the same, for example, metal projections, rods or spokes welded on the internal walls configuring the cavity, but the arrangement of which does not prevent or interfere with the movement of the pistons 4. These reinforcing elements have not been shown in the figures, and their presence depends on the consistency of the filling and the rotation power required for braking the rotation shaft 1.

Other elements represented in the figures are the hub 2, attached on the external portion thereof to the stub axle 9 of the vehicle, enabling the rotation shaft 1 to rotate by means of internal bearings; the screws 8 to fix the tyre rim of the vehicle; and the seal 10, preferably made with an outer metal shell and with a sealing lip made of polytetrafluoroethylene (PTFE).

Thus, in the brake system 100, the rotational portions, i.e., those that rotate with the rotation shaft 1, are the casing 6, the filler based on the dispersion 7 or amalgam, and the screws 8. However, the fixed portions are the hub, the electric linear actuators 3, the cover 5, the stub axle and the seal 10. The pistons 4 move with respect to the inner surface of the cover 5 in a direction parallel to the direction in which the rotation shaft 1 extends, inserting and withdrawing from the filling based on the dispersion 7 or amalgam that rotates together with the casing 6 and the rotation shaft 1.

The elements that make up the brake system 100 are arranged so that, in a non-operating position of the brake, the rotation shaft 1 rotates, the pistons 4 being in a retracted release position, and wherein the front surfaces of the pistons 4 (the surfaces facing the closed cavity) are flush with the inner surface of the cover 5 (the surface facing the closed cavity), as shown in FIG. 1.

When having to brake, the brake pedal will be pressed (or a similar element will be actuated), which will cause the activation of the electric linear actuators 3 so that they produce the movement of the pistons 4, passing to extended braking positions in which the front surfaces of the pistons 4 will progressively enter into the filling of the closed cavity, moving the filling until it is compressed in a final extended braking position represented in FIG. 2. When braking is stopped, for example, by taking the foot off the brake pedal, the electric linear actuators 3 will instantly return the pistons 4 to the non-operating position (FIG. 1), and with the backward movement of the pistons 4, the filling will occupy the space of the cavity left by them.

In this way, the progressive braking of the rotation shaft 1 is produced by the resistance caused by the entry therein of several pistons 4 actuated by means of the stepper motor-based electric linear actuators 3, against the rotation of the compressible filling consisting of a dispersion 7 or amalgam, which rotates integrally inside the cavity formed in the casing 6 that closes the cover 5. Due to this resistance, the filling slows down the rotation thereof until it stops, slowdown and stopping which is transferred to the casing 6 in which the filling is contained and therefore, to the rotation shaft 1 which is integrally coupled to the casing 6. The integral coupling in rotation of the casing 6 and of the rotation shaft 1 can be formed in many ways, for example, by a portion of the rotation shaft 1 being provided with longitudinal ribs that fit into respective longitudinal notches made in the inner wall 61 of the casing 6 that surrounds the central through hole of the casing 6 that crosses the rotation shaft 1.

For a main brake device to be valid in the automotive, aviation and railway sectors, taking into account that they must be coupled to mandatory control and safety systems such as ABS anti-lock or ESP stability control, it must have a minimum actuation speed and a sequence with the following states:

That the shaft released in rotation (rotation shaft 1 in the brake system 100) has an insignificant residual brake torque when there is no actuation on the brake.

That the progressive braking of the rotation of that same rotation shaft 1 once the pistons 4 enter is produced without bumps or peaks until it comes to a complete stop, either manually (by means of a brake pedal, for example) or by means of automation such as stability control or proximity braking.

Instantaneous release of the rotation shaft 1 to be braked is produced when this brake is no longer actuated on or instantaneous intermittent release when the ABS anti-lock requires it.

This sequence must be able to be repeated indefinitely without it entailing a loss of braking performance.

The brake system 100 meets all of these requirements in the sequence described above.

In the braking situation represented in FIG. 2, the electric linear actuators 3 will integrally move the pistons 4 inside the cavity of the casing 6, compressing and kneading the compressible filling consisting of a dispersion 7 or amalgam that it contains, thereby causing the integral slowdown of this casing 6, and in turn since the rotation thereof is also integral, progressively slowing down the rotation shaft 1.

This system can brake with a variety of filler materials consisting of a dispersion 7 or amalgam, thus providing different braking capacities that may be suitable for different vehicles to be braked according to the features and performance thereof.

As mentioned above, and in the case of an automotive brake system, it has been determined as especially advantageous that the dispersion 7 or amalgam that occupies the cavity is formed by a combination of a powdery or granular product, of a size particle size comprised between 45 μm and 1 mm, and more preferably of 0.2 mm spherical, with a lubricating agent present between 1% and 25% by weight with respect to the dispersion 7 or amalgam.

Preferably, the powdery or granular product is mainly made up of one or more of the components of the group consisting of iron powder, titanium powder, aluminium powder, hexagonal boron nitride (h-BN) powder and pressed graphite powder. Preferably the powdery or granular product of the dispersion or amalgam has a particle size comprised between 45 and 50 μm, and more preferably of 45 μm.

As for the lubricating agent, two options stand out because of their efficiency. The first is a perfluoropolyether (PFPE) oil or grease present between 2% and 8%, more preferably between 5% and 7%, and more preferably 6% by weight with respect to the dispersion or amalgam. A PFPE oil is that which is commercially known as Krytox® GPL 107. The second option is a polydimethylsiloxane (PDMS) fluid, oil or grease, present between 15% and 25%, preferably 20%, by weight with respect to the dispersion or amalgam. An example of this lubricating agent is the dimethylpolysiloxane fluid commercially known as POLISIL M-50. Even so, other lubricating agents are not ruled out depending on the needs of each specific case, for example, depending on the maximum temperatures reached, it may be that other types of oil are also sufficient without having to resort to stable lubricating agents at very high temperatures.

The lubricating agent of the dispersion 7 or amalgam, in addition to being the medium in which the powdery or granular product is dispersed and which enables the dispersion 7 or amalgam to move to one place or another of the cavity when the pistons 4 enter or withdraw from it, plays an important role in preventing the friction of the system components.

Thus, in the release situation shown in FIG. 1, the rotation shaft 1, represented as a transmission shaft, passing through the bearings of the hub 2, rotates the casing 6 which, in turn and always in an integral manner, drags the filling consisting of the dispersion 7 or amalgam. This same rotation causes the lubricating agent of the dispersion 7 or amalgam to impregnate the surfaces of the pistons 4, the front surface of each piston 4 that is flush with the inner surface of the cover 5, and prevents the friction of this material against the surface of the cover 5 and also against the planes that make up the surfaces of the pistons 4.

When braking is activated when the pistons 4 move forwards and enter the cavity, the portions of the pistons 4 that come into contact with the dispersion 7 or amalgam will also be impregnated with the lubricating agent.

Several braking tests have been carried out wherein a drag torque of 2 Nm has been achieved wherein the dispersion 7 or amalgam is formed by:

45 μm iron powder with 2% by weight of PFPE oil

45 μm iron powder with 20% by weight of PDMS fluid

Tested examples of 45 μm powder that offer less braking performance, but more than sufficient depending on the means of locomotion; forming a dispersion or amalgam in the same proportion with PFPE and PDMS as the previous examples are titanium powder, aluminium powder and pressed graphite powder. Other possibilities are hexagonal boron nitride (h-BN) powder and alumina powder.

The lubricating agent enables free rotation and the iron powder is that which enables the retention. It is an indivisible granule, the product inside the drum must always have the same volume (if it were divided it would occupy less). The particles of the granules have a size such that the stresses to which they will be subjected when the pistons 4 enter the cavity do not divide them, and it has been shown in tests that a particle size of 45 micrometres is adequate.

Various tests were performed to put the brake system 100 into practice on a test bench, particularly according to an embodiment with a drum-shaped casing 6 and cover 5, both 300 mm in diameter and defining a 20 mm deep cavity therein, measured in a direction parallel to the direction of the rotation shaft 1. Completely occupying the interior of the cavity, 1300 cm³ of a dispersion 7 or amalgam formed by 94% by weight of iron powder with a particle size of 45 μm and 6% by weight of perfluoropolyether oil (PFPE) were arranged. The cover 5 was provided with 2 openings in which respective pistons 4 of 40 mm diameter were fitted, with a maximum actuation depth of 10 mm inside the cavity of the casing 6. The results obtained were the following:

Test rotation speed: from 0 to 1500 rpm

Stopping braking torque: 618 Nm

Rotating braking torque: 384 Nm at any rpm

Drag torque during the test: 2 Nm

Maximum force exerted on the two pistons: 1260 N (commercial model "NEMA 23 captive" linear actuators, each with a maximum force of 1100 N and a linear speed of 30 mm/s)

Maximum movement of the pistons: 5 mm (10 mm maximum stroke)

Maximum temperature reached during the test: 186° C.

Finally, it is considered appropriate to briefly describe an example of a particularly advantageous brake system 100 to ensure that the powdery or granular product will hardly be present in dispersion 7 or amalgam, or will be present in a very small proportion, on the front surfaces of the pistons 4 and the portions of the pistons 4 that come into contact with the filling of the cavity 6 of the casing, i.e., these portions of the pistons 4 will be practically covered only or to a large extent by the lubricating agent of the dispersion 7 or amalgam. This is achieved when the casing 6 is made of a magnetic material, or a material that can be permanently magnetised or is provided with permanent magnets, unlike the cover 5, the pistons 4, the rotation shaft 1 and the hub 2 (and the rest of the fixed portions of the system), and when the powdery or granular product of the dispersion 7 or amalgam is mainly made up of iron powder, with a particle size of about 45 μm. The pistons 4, the cover 5, the hub 2 and the rotation shaft 1 will be made of a non-magnetic or non-magnetisable material, for example titanium, or will be covered with a diamagnetic layer. In this way, due to the magnetic attraction to which it will be subjected, the iron powder will occupy, within the dispersion 7 or amalgam that occupies the cavity, positions closer to the walls of the casing 6, to the detriment of positions close to the pistons 4 and to the cover 5.

Thus, it has been proven that the brake system 100 within its multiple embodiments is an electrically actuated brake system, without hydraulic actuation of any kind, which provides a system capable of acting with a rapid response in all braking situations, which requires virtually no maintenance and does not generate pollution.

The invention claimed is:

1. A brake system for automobiles, the brake system being electrically actuated and wherein the braking effect is produced on a rotation shaft, characterized in that the braking system comprises:

at least one piston actuated by means of a respective electric linear actuator through which the piston is able to move a certain distance forwards and backwards between a retracted release position and a final extended braking position;

a casing provided with a central through hole surrounded by an inner wall of the casing, adapted for integral coupling thereof to the rotation shaft, the walls of the casing forming a cavity laterally closed by a cover that extends in a direction perpendicular to the rotation shaft and provided with a hole for the rotation shaft to pass therethrough but without integral coupling thereto, the cover being provided with at least one opening in which the at least one piston is fitted, closing said opening, and the at least one piston having the ability to move forwards into the closed cavity and move backwards;

each respective electric actuator that actuates the at least one piston being fixedly coupled to the cover;

a filling, arranged occupying the entire closed cavity formed by the casing, the cover and the at least one piston;

the filling having the ability to rotate integrally with the casing;

the filling consisting of a dispersion or amalgam formed by a combination of a powdery or granular product, with a particle size comprised between 45 μm and 1 mm, with a lubricating agent present between 1% and 25% by weight with respect to the dispersion or amalgam;

the brake system when in a non-operating position, the rotation shaft is capable of rotating and the at least one piston being in a retracted release position and a front surface of the piston is oriented towards the closed cavity, and the front surface of the at least one piston is flush with the inner surface of the cover facing the closed cavity;

and when the brake system is in a progressive brake operating position, the at least one piston passes into extended braking positions wherein the front surface of the at least one piston progressively enters into the filling of the closed cavity, moving the filling until it is compressed in a final extended braking position;

the filling moving, occupying space of the cavity left by the at least one piston in the backward movement thereof when returning to the non-operating position;

the cavity being kept closed at all times by the at least one piston in any of the positions.

2. The brake system according to claim 1, characterised in that the at least one piston is able to move from the retracted release position to the final extended braking position according to a direction parallel to a axial direction of the central through hole of the casing.

3. The brake system according to claim 1, characterized that the at least one piston comprises at least two pistons, each piston actuated by means of a respective electric linear actuator of the linear actuators, fitted into the respective openings in the cover.

4. The brake system according to claim 1, characterised in that the casing together with the cover is in a shape of a cylindrical disc or drum.

5. The brake system according to claim 1, characterised in that hardness of material of the casing and of the cover is greater than the hardness of the powdery or granular product of the dispersion or amalgam enclosed in its cavity.

6. The brake system according to claim 1, characterised in that the powdery or granular product of the dispersion or amalgam is a metal powder, a mineral powder, a ceramic powder or a mixture thereof.

7. The brake system according to claim 1, characterised in that the powdery or granular product of the dispersion or amalgam is mainly made up of one or more of components of the group consisting of iron powder, titanium powder, aluminium powder, hexagonal boron nitride powder, pressed graphite powder and ceramic powder.

8. The brake system according to claim 7, characterised in that the powdery or granular product of the dispersion or amalgam has a particle size comprised between 45 μm and 1 mm.

9. The brake system according to claim 1, characterised in that the lubricating agent of the dispersion or amalgam is a perfluoropolyether oil or grease present between 2 and 8%, preferably 6%, by weight with respect to the dispersion or amalgam.

10. The brake system according to claim 1, characterised in that the lubricating agent of the dispersion or amalgam is a polydimethylsiloxane fluid, oil or grease, present between 15 and 25%, preferably 20%, by weight with respect to the dispersion or amalgam.

11. The brake system according to claim 1, characterised in that the lubricating agent of the dispersion or amalgam is a polydimethylsiloxane fluid, oil or grease which includes graphite powder.

12. The brake system according to claim 1, characterised in that the casing is internally provided with drag elements in one or more of internal walls that make up the cavity and that extend inside the same, rods or spokes, the arrangement of which does not interfere with the movement of the piston or pistons inside the cavity.

13. The brake system according to claim 1, characterised in that the casing is made of a magnetic material, a material that can be magnetised or is provided with permanent magnets, unlike the material or materials of the cover and the piston or pistons, and in that the powdery or granular product of the dispersion or amalgam is mainly made up of iron powder and/or ferrite powder of a particle size comprised between 45 μm and 1 mm.

14. The brake system according to claim 1, characterised in that the brake system is part of a train brake.

15. The brake system according to claim 1, characterised in that the brake system is part of a wind turbine brake.

16. The brake system according to claim 1, characterised in that the brake system is part of a machinery brake.

\* \* \* \* \*